United States Patent [19]

Parsons

[11] Patent Number: 5,191,595
[45] Date of Patent: Mar. 2, 1993

[54] T1 DIGITAL COMMUNICATIONS SYSTEM FOR IN-SERVICE DETECTION AND IDENTIFICATION OF MALFUNCTIONING REPEATERS

[75] Inventor: Jeremy E. Parsons, Emmitsburg, Md.

[73] Assignee: Telecommunications Techniques Corporation, Germantown, Md.

[21] Appl. No.: 685,182

[22] Filed: Apr. 12, 1991

[51] Int. Cl.⁵ .............................................. H04B 3/36
[52] U.S. Cl. ...................................... 375/3.1; 375/4; 370/13.1
[58] Field of Search ..................... 375/3.1, 4; 370/13.1; 371/20.2; 379/348; 178/70 R

[56] References Cited

U.S. PATENT DOCUMENTS

| | | | |
|---|---|---|---|
| 3,297,833 | 1/1967 | Hooten | 375/3.1 |
| 3,551,610 | 12/1970 | Pichot | 375/3.1 |
| 3,757,051 | 9/1973 | Girard et al. | 375/4 |
| 3,758,728 | 9/1973 | Le Roch et al. | 375/3.1 |
| 3,842,220 | 10/1974 | Arras | 375/3.1 |
| 3,909,563 | 9/1975 | Ghosh et al. | 375/3 |
| 3,950,622 | 4/1976 | Taylor | 375/3.1 |
| 4,025,737 | 5/1977 | Brewer | 370/13.1 |
| 4,319,080 | 3/1982 | Kuwahara | 375/3.1 |
| 4,406,919 | 9/1983 | Pospichill | 178/69 G |
| 4,713,810 | 12/1987 | Chum | 371/4 |
| 4,742,518 | 5/1988 | Shedd | 371/22 |
| 4,980,887 | 12/1990 | Dively et al. | 370/13.1 |
| 6,710,924 | 12/1987 | Chum | 371/4 |

Primary Examiner—Curtis Kuntz
Assistant Examiner—T. Glebretinsae
Attorney, Agent, or Firm—Donald A. Kettlestrings

[57] ABSTRACT

An improvement to T1 digital communications systems uses the alternate mark inversion (AMI) encoding format, typically used in T1 systems, and the D.C. system that powers the repeaters for enabling quick and accurate in-service detection and identification of malfunctioning or failed repeaters.

11 Claims, 5 Drawing Sheets

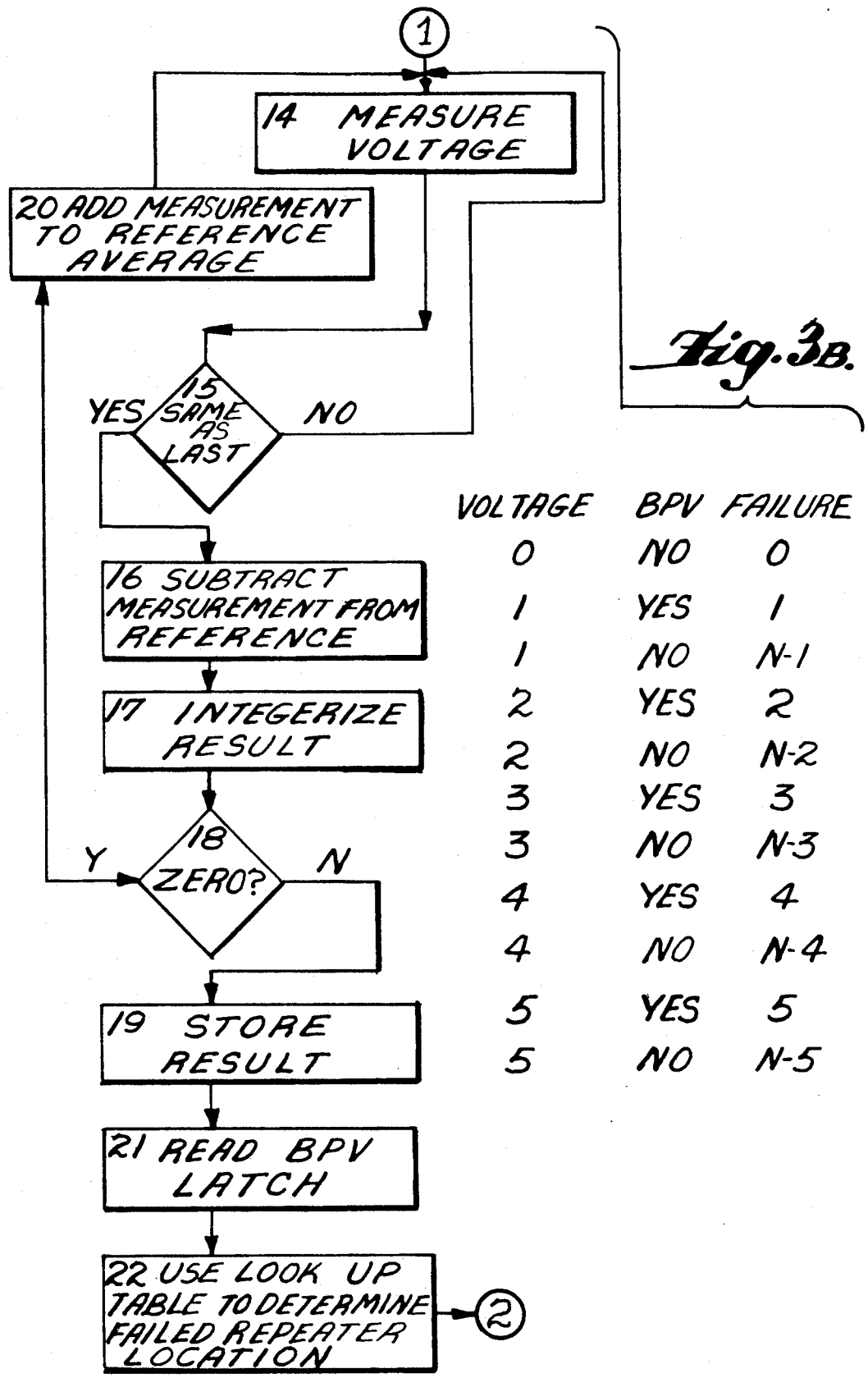

T1 DIGITAL COMMUNICATIONS SYSTEM FOR IN-SERVICE DETECTION AND IDENTIFICATION OF MALFUNCTIONING REPEATERS

BACKGROUND OF THE INVENTION

This invention relates to digital communications systems and more particularly to an improvement in T1 digital communications systems for in-service detection and identification of malfunctioning repeaters.

Although various methods and systems are known for detecting malfunctioning repeaters in T1 communications systems, the present methods and systems of detection are time consuming and inaccurate.

It is, therefore, an object of the present invention to provide an improvement to T1 digital communications systems for quickly and accurately detecting and identifying malfunctioning or failed repeaters.

Another object is to provide such an improvement which uses the alternate mark inversion (AMI) encoding format that is typically used in T1 systems and the system that powers the repeaters for quickly and accurately detecting and identifying malfunctioning or failed repeaters in the T1 system.

A further object of the invention is the provision of such an improvement which is inexpensive to implement.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

SUMMARY OF THE INVENTION

To achieve these and other objects, the present invention provides an improved T1 digital communications system for in-service detection and identification of malfunctioning or failed repeaters wherein the improvement comprises: first means in operative relationship with outputs of each of the repeater regenerator circuits for detecting unintentional bipolar violations; impedance means in series D.C. circuit relationship with the D.C. power source for the repeaters, with the terminating equipment of the T1 system and with first predetermined of the repeater regenerator circuits; means in circuit relationship with the first detecting means and with the impedance means for changing impedance values of the impedance means by a predetermined amount in response to detection of unintentional bipolar violations by the first detecting means; means in circuit relationship with the first predetermined regenerator circuits, with the impedance means and with the D.C. power source for the repeaters for monitoring the voltage drop across the predetermined regenerator circuits and the impedance means; second means in operative relationship with second predetermined of the regenerator circuits of the repeaters for detecting unintentional bipolar violations from the second predetermined regenerator circuits; and means in operative relationship with the voltage monitoring means and with the second detecting means for determining and indicating the occurrence and location of a malfunctioning or failed repeater.

It is to be understood that both the foregoing general description and the following detailed description are exemplary and explanatory but are not restrictive of the invention.

BRIEF DESCRIPTION OF THE DRAWINGS

The accompanying drawings, which are incorporated in and constitute a part of this specification, illustrate an example of a preferred embodiment of the invention and, together with the description, serve to explain the principles of the invention.

DESCRIPTION OF THE PREFERRED EMBODIMENT

Figure 1:
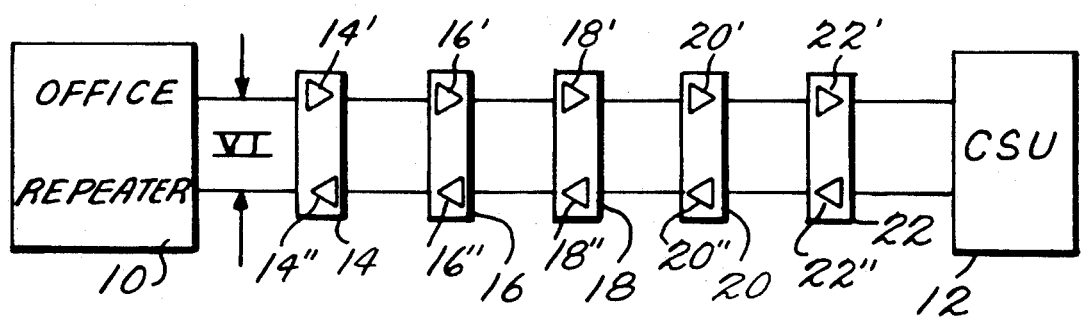
FIG. 1 is a block diagram showing a portion of a conventional T1 digital communications system having a plurality of regenerative span repeaters between terminating equipment, such as an office repeater and a channel service unit (CSU)
Figure 3D:
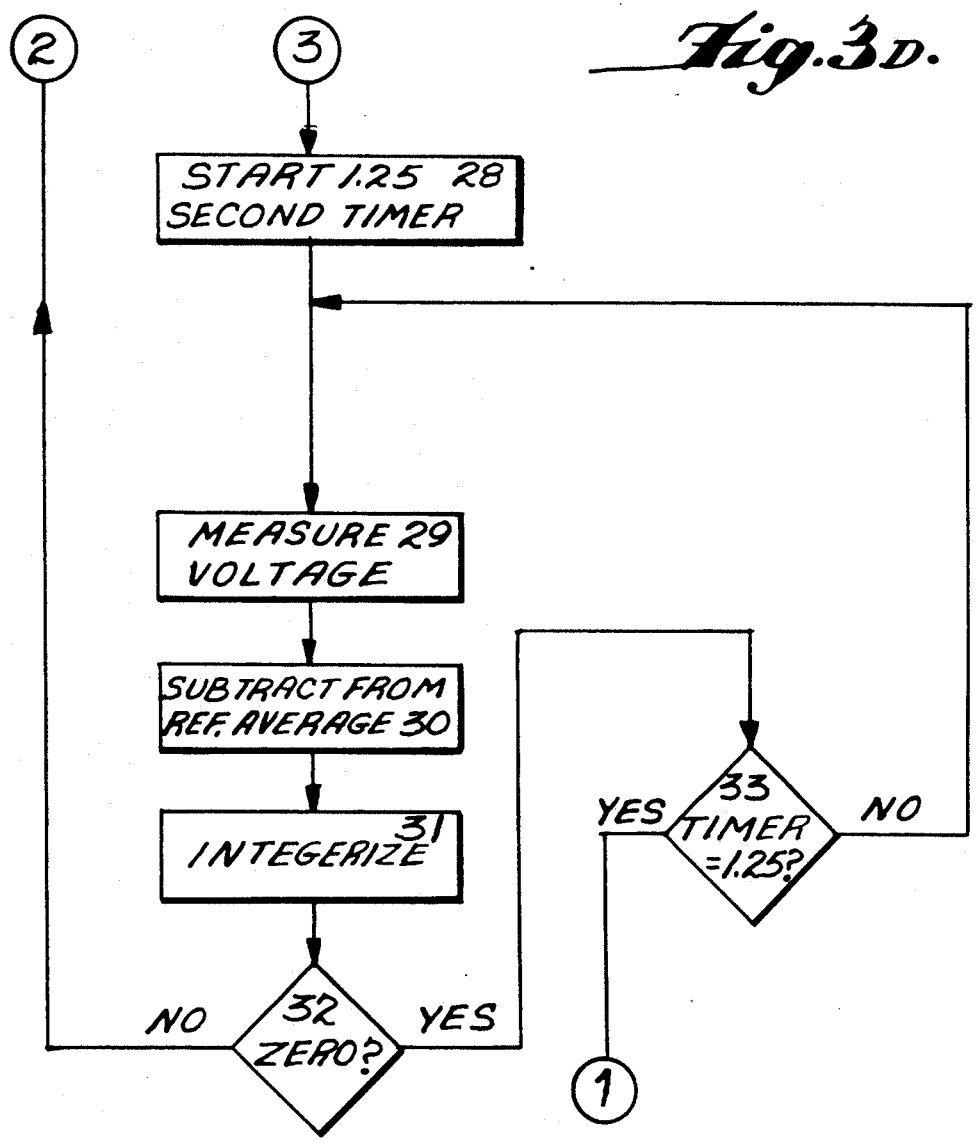
FIG. 3 is a flow chart showing the operation of a preferred software algorithm to be used in implementing the invention.

T1 communication systems are well known. The T1 system was developed to reduce the amount of copper required to transmit voice communications. The T1 system enables standard voice grade twisted pair copper wire to carry twenty-four simultaneous conversations. This is accomplished by digitizing the voice signal and multiplexing it with twenty-three other voice signals which make up a 1.544 megahertz data stream.

By using alternate mark inversion (AMI) encoding, data can be transmitted for up to one mile over standard twisted pair wire before regeneration of the signal is required. Each mile requires a regenerative repeater to recover the attenuated digital signal and to retransmit it to the next network component.

Alternate mark inversion encoding provides that each successive one or mark transmitted should be encoded in the opposite polarity of the one or mark that preceded it. For example, the sequence 111 would be transmitted as a $+1-1+1$ or $-1+1-1$, where $-1$ represents a negative polarity one pulse transmitted as a negative three-volts in amplitude, and $+1$ represents a positive three-volt pulse. Zeros are transmitted as the absence of a pulse. The sequence 1110001 would be transmitted as $+1-1+1000-1$ or $-1+1-1000+1$. If this alternating coding sequence is violated within the transmission system, it is indicative of an error. These errors are called bipolar violations or BPVs. The sequence 110001, if received as $-1+10+10-1$, for example, can be identified as having an error in the fourth position because AMI coding dictates that the $+1$ in the fourth position should have been encoded as $-1$.

Since the adoption of AMI coding, several new types of coding have been developed, such as bipolar with eight zero substitution (B8ZS). These new coding schemes use the basic AMI principle, but strive to increase the ones density by coding strings of multiple zeros as unique sequences which include zeros, ones and bipolar violations. These sequences are encoded using predetermined rules and are easily identified, allowing the zero sequence to be easily reconstructed. Unintentional bipolar violations introduced by noise or impairments of the transmission medium or equipment remain easily distinguishable from bipolar violations intentionally introduced in the coding scheme. Therefore, unintentional bipolar violations continue to be used to determine the error performance of a T1 span.

T1 repeaters are wired in series, and a D.C. current is sent through the twisted pair copper wire to each of the repeaters. Each repeater drops enough voltage to power the circuitry required to operate the regenerative circuits of the repeater to regenerate the communications signal. One of the functions of the T1 system terminating equipment, which is typically located in the office repeater, is to provide a D.C. current source and sink which powers the repeatered span. This current is nominally sixty mA although other currents can be used. The terminating equipment (office repeater) will vary its output voltage as necessary up to the limits of its design to regulate and maintain a constant sixty mA current.

The improvement described herein exploits the AMI encoding format and the D.C. system that powers the repeaters in the T1 span to provide a system for in-service detection and identification of malfunctioning repeaters. Circuits which are commonly used and which can discriminate between intentional bipolar violations used in coding schemes and unintentional bipolar violations indicative of transmission errors are provided at each repeater of the T1 system. Detected unintentional bipolar violations are signaled to the terminating equipment at the end of the span to indicate the location of the problem so that someone can be dispatched to the appropriate location to repair the problem. The communication of the failure location is accomplished by this invention by use of the D.C. current path in the T1 system, and in-service monitoring is provided which will not interfere with the communications traffic.

In accordance with the invention, each T1 span repeater will provide all of the functions now found in standard T1 span repeaters, and a state machine circuit or application specific integrated circuit (ASIC) is be provided in each span repeater to monitor for unintentional bipolar violations. If an unintentional bipolar violation (BPV) is detected at a repeater, the repeater reports back to the terminating equipment (office repeater) by modulating the span repeater's resistance to cause the D.C. supply voltage at the terminating equipment (office repeater) to change to maintain a constant sixty mA current.

Further in accordance with the invention, the terminating equipment (office repeater) determines the error performance of the span repeaters by counting the number of seconds the office repeater's D.C. supply voltage changes. Each change of one or more volts in the office repeater's supply voltage equates to an errored second. The office repeater also determines the location of the failed or malfunctioning span repeater. Once a BPV is generated, it propagates through all of the remaining repeaters to the end of the span. Each repeater that receives a BPV reduces its resistance and causes the office repeater to decrease its D.C. output voltage in proportion to the number of repeaters which received the unintentional BPV to maintain a constant current. The amplitude of the office repeater's voltage change is used to help identify the location of the malfunctioning or failed repeater.

Additional information, however, is required to determine the location of the malfunctioning repeater. Whether the unintentional BPVs are occurring toward or away from the office repeater determines how the office repeater's D.C. output voltage relates to the location of the malfunctioning span repeater. If the office repeater also detects the unintentional BPV, that indicates the BPVs are occurring in the repeater span transmitting information toward the office repeater. In this example, the closer the failed span repeater is to the office repeater, the less the D.C. output voltage in the office repeater would decrease, since not as many span repeaters would receive an unintentional BPV. If the office repeater does not detect any unintentional BPVs but the D.C. output voltage in the office repeater decreases, then the malfunctioning span repeater is in the communications path from the office repeater toward the other end of the repeater span. In that case, the amount the D.C. output voltage in the office repeater would have to change to maintain a constant sixty mA current would increase as the failed span repeater was located closer to the office repeater.

FIG. 1 and table 1 below illustrate how a failed span repeater is located by the improved system of this invention. FIG. 1 shows a conventional T1 span between first terminating equipment (office repeater) 10 and second terminating equipment or customer service unit (CSU) 12. A plurality of regenerative span repeaters 14–22 are located between office repeater 10 and CSU 12, and each repeater includes two signal regenerator circuits 14', 14''; 16', 16''; 18', 18''; 20', 20''; and 22', 22'', respectively.

Table 1 illustrates the determination of which span repeater 14–22 is malfunctioning based on voltage V1 at office repeater 10 and on whether office repeater 10 receives any unintentional bipolar violations. Table 1 is based on an example where V1 at office repeater 10 is nominally forty-seven volts. Table 1 is also based on the assumption that each repeater 14–22 normally drops seven volts and CSU 12 drops twelve volts. In accordance with the system of this invention, when a span repeater 14–22 receives an unintentional BPV, its resistance will decrease so that it will drop six volts. CSU 12 does not transmit unintentional BPVs, and CSU 12 completes the D.C. simplex current loop which powers repeaters 14–22 and which originates with office repeater 10. Table 1 shows how malfunctioning repeaters can be detected and located based on the office repeater voltage V1 and whether office repeater 10 is receiving any unintentional BPVs.

TABLE 1

| V1 | Unintentional BPVs Detected | Malfunctioning or Failed Repeater |
|---|---|---|
| 47V | No | — |
|  | No | — |
| 46V | No | 22 |
|  | Yes | 14 |
| 45V | No | 20 |
|  | Yes | 16 |
| 44V | No | 18 |
|  | Yes | 18 |
| 43V | No | 16 |
|  | Yes | 20 |
| 42V | No | 14 |
|  | Yes | 22 |

Figure 2:
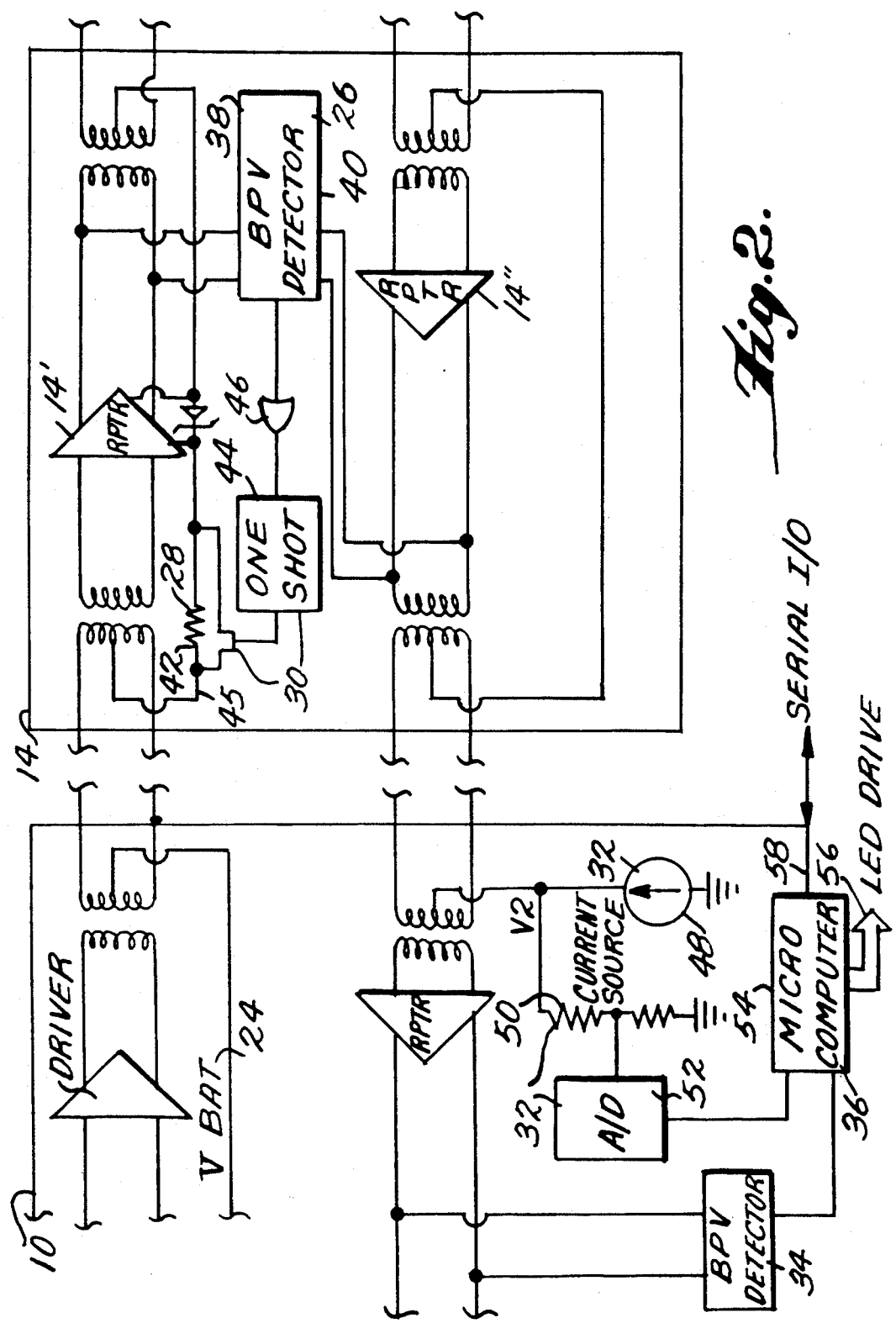
FIG. 2 is a schematic illustration of an office repeater and a regenerative span repeater and showing elements of the invention.
Figure 3A:
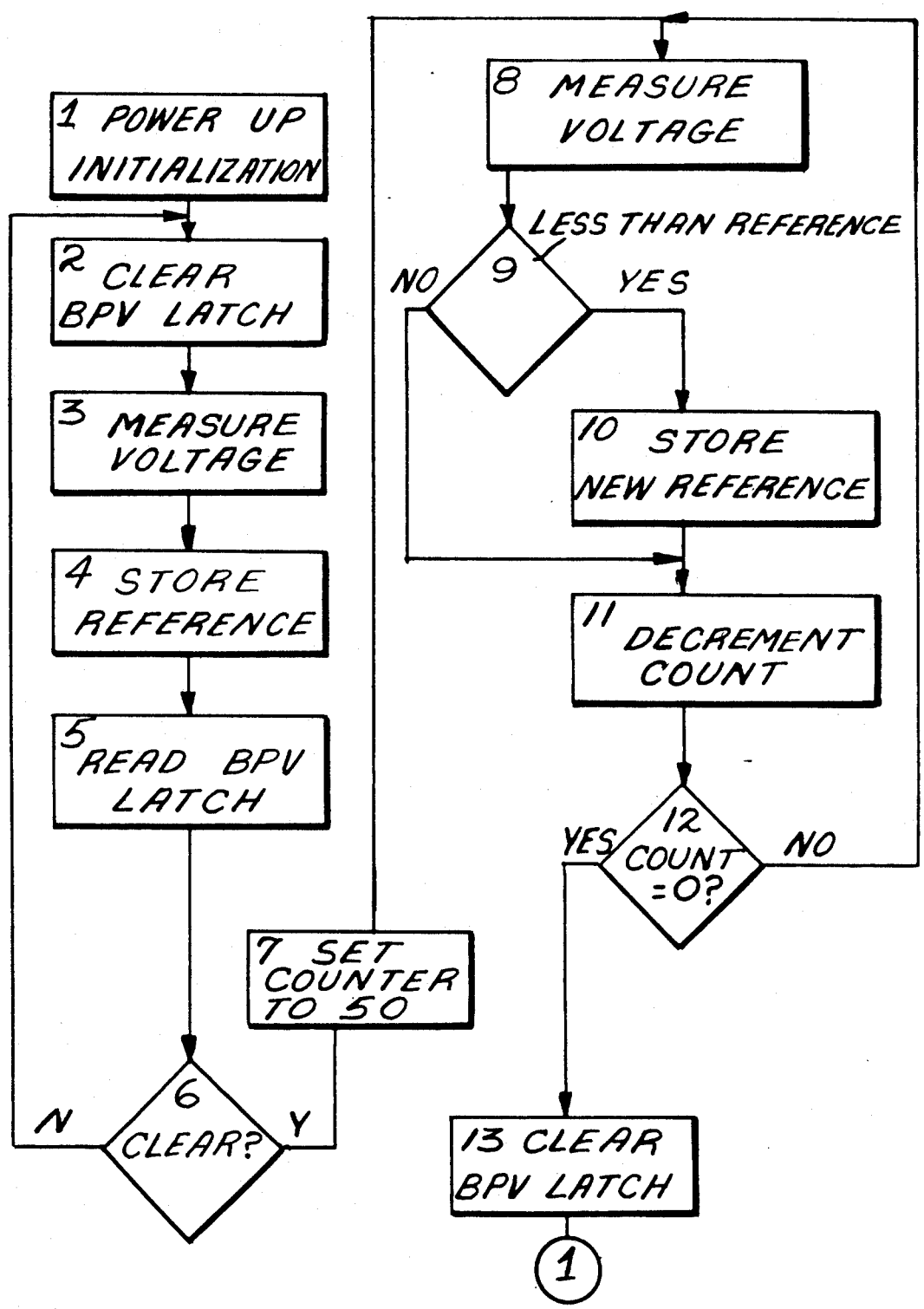
Figure 3C:
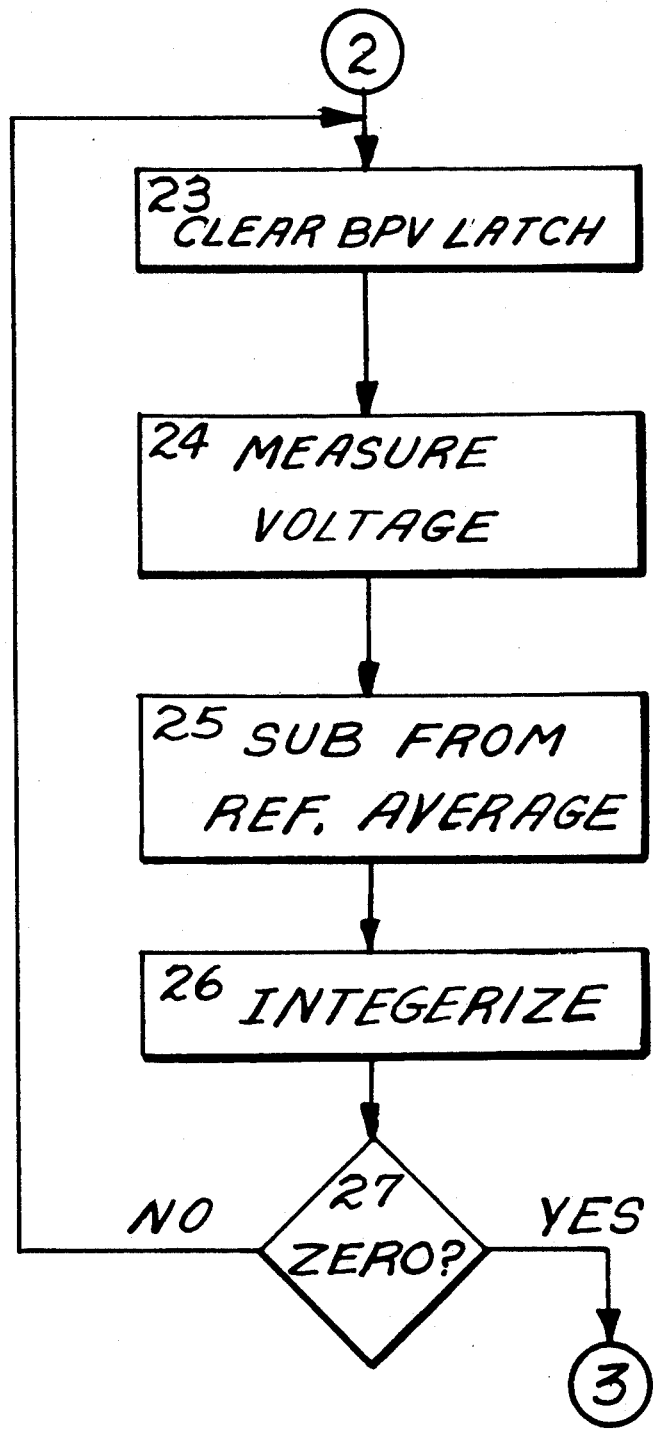

With further reference now to the drawings, wherein like reference characters designate like or corresponding parts throughout the several views, there is shown in FIG. 2 a more detailed schematic illustration of first terminating equipment (office repeater) 10 and span repeater 14. It should be understood that each of repeaters 14–22 contains the same elements and that more or fewer span repeaters can be used.

Office repeater 10 in the T1 digital communications system includes a substantially constant voltage D.C. electrical power source 24. Repeaters 14-22 are connected in duplex electrical circuit relationship between terminating equipment 10, 12 and in D.C. circuit relationship with D.C. power source 24 and with terminating equipment 12.

In accordance with the invention, first means 26 are provided in operative relationship with outputs of each of regenerator circuits 14', 14"; 16', 16"; 18', 18"; 20', 20"; and 22', 22'", respectively for detecting unintentional bipolar violations. Such BPV detectors are known and are available from several semi-conductor manufacturers. For example, Motorola manufactures such a BPV detector as part MC145439.

Impedance means 28, preferably a resistance, is connected in series D.C. circuit relationship with D.C. power source 24, with CSU 12 and with each of regenerator circuits 14', 16', 18' 20', and 22', respectively. Means 30 are provided in circuit relationship with first detecting means 26 and with impedance means 28 for changing the impedance value of impedance means 28 by a predetermined amount in response to detection of unintentional bipolar violations by detecting means 26.

Means, generally indicated at 32, are provided in circuit relationship with first predetermined regenerator circuits 14', 16', 18' 20', and 22', with impedance means 28 in each of repeaters 14-22, and with D.C. power source 24 for monitoring the voltage drop across all of regenerator circuits 14', 16', 18' 20', and 22' and across all of impedance means 28.

Second means 34 are provided in operative relationship with regenerator circuits 14", 16", 18", 20" and 22" for detecting unintentional bipolar violations from regenerator circuits 14"-22". The invention further provides means 36 in operative relationship with monitoring means 32 and with detecting means 34 for determining and indicating the occurrence and location of a malfunctioning repeater 14-22.

Each of repeaters 14-22 includes a first regenerator circuit 14'-22', respectively and a second regenerator circuit 14"-22", respectively. Detecting means 26 include a first bipolar violation detector circuit 38 in each repeater, and each detector circuit 38 is connected in circuit relationship with the output of regenerator circuits 14'-22', respectively. Similarly, a second bipolar violation detector circuit 40 is associated with each repeater and each detector circuit 40 is connected in circuit relationship with the output of regenerator circuits 14"-22", respectively.

Impedance means 28 preferably include a plurality of resistors 42, and one each of resistors 42 is connected in series D.C. circuit relationship with regenerator circuits 14'-22', respectively, within each of repeaters 14-22 and with D.C. power source 24.

Impedance value changing means 30 include a plurality of one-shot circuits 44 and switching elements, e.g. field-effect transistors (FET) 45. Each FET 45 is connected between the output of a one-shot 44 and a respective resistor 42, and each FET 45 is in parallel circuit relationship with each respective resistor 42. One each of one-shot circuits 44 is connected in circuit relationship between bipolar violation detector circuits 38, 40, respectively, and FET 45 in each repeater 14-22. An OR gate 46 is connected between detectors 38, 40 and one-shot circuits 44. One-shot circuits 44 are known. For example, National Semiconductor Corp. manufactures such a one-shot as part (74 HC 423).

In accordance with the invention, monitoring means 32 include means 48 in circuit relationship with first regenerator circuits 14'-22', with resistors 42 and with power source 24 for maintaining a substantially constant D.C. current through repeaters 14-22, through first regenerator circuits 14'-22' and through resistors 42 in each of repeaters 14-22.

Monitoring means 32 further include voltage detecting means 50 in circuit relationship with constant current source 48, with first regenerator circuits 14'-22', with resistors 42 in each of repeaters 14-22 and with power source 24 for detecting a first voltage V2. Voltage V2 is equal to the difference between substantially constant voltage VBAT of power source 24 and the total voltage drop across first regenerator circuits 14'-22' and across each of resistors 42 in repeaters 14-22 resulting from substantially constant D.C. current passing through regenerator circuits 14'-22' and through each of resistors 42.

Monitoring means 32 also include means 52 in circuit relationship with voltage detecting means 50 for converting first voltage V2 from an analog voltage to a binary digital representation of first voltage V2. Converter 52 measures the output voltage of constant current source 48. Analog to digital converters are known. For example, G.E. Intersil manufactures such an A/D converter as part number (ICL7135).

Determining and indicating means 36 include a microcomputer 54 in circuit relationship with analog to digital converter 52 and with second means 34 for detecting unintentional bipolar violations. Microcomputer 54 is programmed with an algorithm for collecting data from detecting means 34 and from converter 52 and for analyzing the data to determine if a repeater is malfunctioning. Means 56 are provided in operative relationship with microcomputer 54 for displaying information about any malfunctioning repeater, such as by an LED display. A communications link 58 is also provided to a host computer (not shown) via a serial RS-232 link, for example, to transmit information about malfunctioning or failed repeaters.

Each of one-shot circuits 44 in each repeater 14-22 preferably includes circuitry for producing an output signal of first predetermined duration followed by a blanking period of second predetermined duration in response to detection of an unintentional bipolar violation by at least one of bipolar violation detector circuits 38, 40 within each repeater.

Microcomputer 54 is programmed with an algorithm which searches the output from converter 52 for signals representative of voltages V2 at the output of constant current source 48 indicative of failure or malfunctioning of one or more of repeaters 14-22, which voltages are preceded by a reference voltage for a period longer than a predetermined blanking period representative of the occurrence of no unintentional bipolar violations within repeaters 14-22.

The repeater monitoring system described herein will provide a constant voltage V2 when no unintentional BPVs are detected in repeaters 14-22. Upon the occurrence of an unintentional BPV in one of the repeaters, the repeaters downstream of the repeater in which the unintentional BPV occurred will lower their resistance to cause voltage V2 to increase. The magnitude of this voltage increase will depend upon how many repeaters detect the unintentional BPV and will, therefore, indicate the location of the malfunctioning or failed repeater.

A problem arises, however, if there is a constant source of unintentional BPVs due to a constantly malfunctioning or failing repeater. This situation would cause problems in determining the location of the malfunctioning or failed repeater because it would not be possible to establish a "no BPV" reference voltage at V2. This would result in a false "no BPV" detected indication or false failed repeater location reports.

To solve this problem, a blanking period has been added after each unintentional BPV detection indication by a repeater. The repeater will lower its resistance (which will cause voltage V2 to increase) for one second on the occurrence of an unintentional BPV and will then ignore any subsequent unintentional BPVs for a one and one-quarter second blanking period. This will guarantee that a reference voltage can be measured at V2 and will allow constantly failing repeaters to be located.

This solution itself causes some complication in the case of multiple repeater failures or malfunctioning. The complication is avoided, however, by use of an intelligent software algorithm with microcomputer 54 which searches for voltages at V2 indicative of failing or malfunctioning repeaters which are preceded with the "no BPV" reference voltage for a period longer than the blanking period. The magnitude of this voltage measurement would be assured of properly identifying a failed repeater location. If multiple repeaters are failing or malfunctioning, they would each be identified as long as the failures are spaced at intervals in excess of the blanking period.

FIGS. 3A-3D show a flow chart describing the operation of a preferred software algorithm for determining the location of failed or malfunctioning repeaters. Following is a description of each step in FIGS. 3A-3D, and the numbers identifying each step in the algorithm correspond to the numbers in the flow chart of FIGS. 3A-3D.

FLOW CHART DESCRIPTION

1. Power Up Initialization—When microcomputer 54 is first powered up or is reset, it will enter this state. All micro-controller registers are initialized and all counters are cleared.
2. Clear BPV Latch—This step clears the input bit which stores the occurrences of unintentional BPVs detected by BPV detector 34 in FIG. 2.
3. Measure Voltage—This step measures the voltage V2.
4. Store Reference—This step stores this voltage as the initial "No BPV" reference voltage.
5. Read BPV latch—This step reads the BPV input bit.
6. Clear?—If the BPV input bit is set, then steps 2 through 5 are repeated.
7. Set Counter to 50—This step presets an internal counter to 50. This counter is used to execute steps 8 through 12 fifty times. This algorithm will find the "No BPV" reference voltage.
8. Measure Voltage—Measure voltage at V2.
9. Less Than Reference—Compare this measurement against what is currently stored in the "No BPV" reference. If this voltage is less, execute step 10; if not execute step 11.
10. Store New Reference—Store this voltage measurement as the new "No BPV" reference.
11. Decrement Counter—Decrement the counter which was initialized in step 7.
12. Count=0?—If the count is equal to zero proceed to step 13; if not repeat steps 8 through 11.
13. Clear BPV Latch—This step clears the input bit which stores the occurrences of unintentional BPVs detected by BPV detector 34 in FIG. 2. This algorithm determines if a repeater is failing and also determines its location.
14. Measure Voltage—This step measures the voltage V2.
15. Same as Last—If the voltage V2 is changing, repeat step 14.
16. Subtract Measurement from Reference—This step determines the difference between the voltage V2 measured in step 14 and the "No BPV" reference voltage. This result is used in step 17.
17. Integerize Result—This step rounds the result of step 16 up or down to the next whole number. This number is used as an index to a Look-Up table (FIG. 3B) to determine which repeater is failing. The failing repeater is identified with respect to the distance from the Office Repeater. Since the number of repeaters in the span is unknown, the terminology N−1, N−2, etc. is used to indicate the first or second repeater from the farthest end of the span.
18. Zero?—If the result of step 17 is zero, there are no errors, so proceed to step 20. If the result is non-zero, there is an error.
19. Store Result—Temporarily store the result.
20. Add Measurement to Reference Voltage—The measurement was zero, so add the zero measurement to the average "No BPV" reference voltage. Averaging this voltage will compensate for drifts due to temperature changes.
21. Read BPV Latch—Read the input port bit which latches the BPV.
22. Use the Look-Up table to determine failed repeater location. The voltage stored in step 19 and the status of the BPV bit are used to determine which repeater has failed. This is accomplished using the Look-Up table. This subroutine waits until the input voltage V2 returns to the "No BPV" reference voltage.
23. Clear BPV Latch—This step clears the input bit which stores the occurrences of unintentional BPVs detected by BPV detector 34 in FIG. 2.
24. Measure Voltage—This step measures the voltage V2.
25. Subtract Measurement from Reference—This step determines the difference between the voltage V2 measured in step 24 and the "No BPV" reference voltage.
26. Integerize Result—This step rounds the result of step 25 up or down to the next whole number.
27. Zero?—If the result of step 26 is zero, there are no errors, so proceed to step 28. The zero result will mean that BPV reporting activity has concluded. Wait for the duration of the blanking period and make sure no further errors are detected.
28. Start 1.25 Second Timer—Start a timer which will expire at the end of the blanking period.
29. Measure Voltage—This step measures the voltage V2.
30. Subtract Measurement from Reference—This step determines the difference between the voltage V2 measured in step 29 and the "No BPV" reference voltage.
31. Integerize Result—This step rounds the result of step 30 up or down to the next whole number.

32. Zero?—If the result of step 31 is non-zero, return to step 23 because an error has been detected during the blanking period.

33. Timer=1.25?—If the 1.25 second timer has not expired, repeat steps 29 through 32. When the timer expires, go to step 14.

The repeater monitoring system described herein provides a system for quickly and accurately locating failed or malfunctioning repeaters in T1 digital communications systems.

The invention in its broader aspects is not limited to the specific details shown and described, and departures may be made from such details without departing from the principles of the invention and without sacrificing its chief advantages.

What is claimed is:

1. In a T1 digital communications system using alternate mark inversion encoding and including first terminating equipment having a substantially constant voltage D.C. electrical power source, second terminating equipment, and a plurality of signal repeaters, each repeater comprised of a plurality of signal regenerator circuits each having an input and an output and each repeater connected in duplex electrical circuit relationship between said first and said second terminating equipment and in D.C. circuit relationship with said D.C. power source and said second terminating equipment, the improvement comprising apparatus for in-service detection and identification of malfunctioning or failed said repeaters, said apparatus comprising:

first means in operative relationship with outputs of each of said regenerator circuits for detecting unintentional bipolar violations;

impedance means in series D.C. circuit relationship with said D.C. power source, with said second terminating equipment and with first predetermined of said regenerator circuits;

means in circuit relationship with said first detecting means and with said impedance means for changing impedance values of said impedance means by a predetermined amount in response to detection of unintentional bipolar violations by said first detecting means;

means in circuit relationship with said first predetermined regenerator circuits, with said impedance means and with said D.C. power source for monitoring the voltage drop across said predetermined regenerator circuits and said impedance means;

second means in operative relationship with second predetermined of said regenerator circuits for detecting unintentional bipolar violations from said second predetermined regenerator circuits; and means in operative relationship with said voltage monitoring means and with said second detecting means for determining and indicating the occurrence and location of a malfunctioning said repeater.

2. The improvement as in claim 1 wherein each of said repeaters includes first and second regenerator circuits and wherein said first detecting means include a first bipolar violation detector circuit connected in circuit relationship with the output of said first regenerator circuit and a second bipolar violation detector circuit connected in circuit relationship with the output of said second regenerator circuit.

3. The improvement as in claim 2 wherein said impedance means include a plurality of resistors, one each of said resistors connected in series D.C. circuit relationship with said first regenerator circuit in each of said repeaters and with said D.C. power source.

4. The improvement as in claim 3 wherein said impedance value changing means include a plurality of switching elements, one each connected in parallel circuit relationship with each of said resistors, and a plurality of one-shot circuits, one each of said one-shot circuits connected in circuit relationship between said bipolar violation detector circuits and said switching elements in each of said repeaters.

5. The improvement as in claim 4 wherein said monitoring means include means in series D.C. circuit relationship with said first regenerator circuits, with said resistors, and with said electrical power source for maintaining a substantially constant D.C. current through said repeaters, through said first regenerator circuits, and through said resistors.

6. The improvement as in claim 5 wherein said monitoring means further include voltage detecting means in circuit relationship with said constant current maintaining means, with said first regenerator circuits, with said resistors and with said electrical power source for detecting a first voltage equal to the difference between said substantially constant voltage of said power source and the voltage drop across said first regenerator circuits and said resistors resulting from said substantially constant D.C. current passing through said first regenerator circuits and said resistors.

7. The improvement as in claim 6 wherein said monitoring means further include means in circuit relationship with said voltage detecting means for converting said first voltage from an analog voltage to a binary digital representation of said first voltage.

8. The improvement as in claim 7 wherein said determining and indicating means include a microcomputer in circuit relationship with said analog to digital converting means and with said second bipolar violation detecting means, said microcomputer programmed with an algorithm for collecting data from said second bipolar violation detecting means and from said analog to digital converting means and for analyzing said data to determine if a repeater is malfunctioning, and means in operative relationship with said microcomputer for displaying information about any said malfunctioning repeater.

9. The improvement as in claim 8 wherein each of said one-shot circuits in each said repeater includes means for producing an output signal of first predetermined duration followed by a blanking period of second predetermined duration in response to detection of an unintentional bipolar violation by at least one of said bipolar violation detector circuits within said repeater.

10. The improvement as in claim 9 wherein said algorithm searches the output from said analog to digital converting means for signals representative of voltages at the output of said constant current maintaining means indicative of malfunctioning said repeaters, which voltages are preceded by a reference voltage for a period longer than said blanking period representative of the occurrence of no bipolar violations within said repeaters.

11. In a T1 digital communications system using alternate mark inversion encoding and including first terminating equipment having a substantially constant voltage D.C. electrical power source, second terminating equipment, and a plurality of signal repeaters, each repeater comprised of a plurality of signal regenerator circuits each having an input and an output and each repeater connected in duplex electrical circuit relationship between said first and said second terminating equipment and in D.C. circuit relationship with said D.C. power source and said second terminating equipment, the improvement comprising apparatus for in-service detection and identification of malfunctioning or failed said repeaters, said apparatus comprising:

first means in operative relationship with each of said repeaters for detecting the occurrence of a malfunction or failure of each said repeater;

impedance means in series D.C. circuit relationship with said D.C. power source, with said second terminating equipment and with first predetermined of said regenerator circuits;

means in circuit relationship with said first detecting means and with said impedance means for changing impedance values of said impedance means by a predetermined amount in response to detection of a malfunction or failure of said repeater by said first detecting means;

means in circuit relationship with said first predetermined regenerator circuits, with said impedance means and with said D.C. power source for monitoring the voltage drop across said predetermined regenerator circuits and said impedance means;

second means in operative relationship with said repeaters for detecting a malfunction or failure of one or more of said repeaters; and means in operative relationship with said voltage monitoring means and with said second detecting means for determining and indicating the occurrence and location of a malfunctioning said repeater.

* * * * *